United States Patent
Peyravian et al.

(10) Patent No.: US 6,826,686 B1
(45) Date of Patent: Nov. 30, 2004

(54) METHOD AND APPARATUS FOR SECURE PASSWORD TRANSMISSION AND PASSWORD CHANGES

(75) Inventors: Mohammad Peyravian, Cary, NC (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,944

(22) Filed: Apr. 14, 2000

(51) Int. Cl.[7] .............................. H04L 9/00; H04L 9/32
(52) U.S. Cl. ................ 713/168; 713/169; 713/181; 713/202
(58) Field of Search .............................. 713/168, 169, 713/181, 202

(56) References Cited

U.S. PATENT DOCUMENTS

| | | | | |
|---|---|---|---|---|
| 4,649,233 A | * | 3/1987 | Bass et al. ................... 713/171 |
| 5,148,479 A | * | 9/1992 | Bird et al. ................... 713/155 |
| 5,204,966 A | * | 4/1993 | Wittenberg et al. ......... 713/202 |
| 5,323,146 A | | 6/1994 | Glaschick .............. 340/825.34 |
| 5,666,415 A | * | 9/1997 | Kaufman ..................... 713/159 |
| 5,719,941 A | | 2/1998 | Swift et al. ..................... 380/25 |
| 5,787,169 A | * | 7/1998 | Eldridge et al. ............. 713/165 |
| 6,064,736 A | * | 5/2000 | Davis et al. ................. 713/155 |
| 6,178,508 B1 | * | 1/2001 | Kaufman ..................... 713/183 |
| 6,601,175 B1 | * | 7/2003 | Arnold et al. ............... 713/202 |
| 6,628,786 B1 | * | 9/2003 | Dole ............................ 380/44 |
| 6,668,323 B1 | * | 12/2003 | Challener et al. ........... 713/183 |
| 6,687,836 B1 | * | 2/2004 | Butler ......................... 713/202 |

* cited by examiner

*Primary Examiner*—Gilberto Barrón
*Assistant Examiner*—Kambiz Zand
(74) *Attorney, Agent, or Firm*—Gerald R. Woods

(57) ABSTRACT

A secure method for changing a password to a new password when the passwords are being transmitted over a network is presented. The present invention does not require the use of any additional keys (such as symmetric keys or public/private key pairs) to protect the password exchanges. Moreover, the present solution does not require the use of any encryption algorithms (such as DES, RC4/RC5, etc.), it only requires the use of a collision-resistant hash function.

4 Claims, 3 Drawing Sheets

METHOD AND APPARATUS FOR SECURE PASSWORD TRANSMISSION AND PASSWORD CHANGES

BACKGROUND OF THE INVENTION

In a networking environment, it is often the case that users interact with local application programs. The local application programs may exchange data with remote application programs on behalf of the users. When the remote application program controls resources of value, it most likely will require a user name (or userid) and password for verification and access control. Userids are considered, in most cases, to be public information, but passwords are considered to be private or secret. The local application program sends the userid and password combination to the remote application program over a network.

It is also very common for a server in a network of resources to be used to provide controlled access to the network or to applications residing within the network.

Accordingly a server manages the resources and data for which it is responsible and facilitates access to the resources and data by networked machines which logged onto the network by way of credentials.

It is also common in the art for one or more network servers to be responsible for administering and limiting network access to clients for which valid account credentials have been provided during a network logon procedure. In this respect, the network server maintains a security database including account identification corresponding to users and services authorized to access the network and the protected network resources for which the network server enforces limited access.

It is sometimes necessary for the user to change his password to a new password. When the user wants to change the password, he submits his userid, old password and a new password to the local application program. The local application program then sends the userid, old password and new password combination to the remote application program over the network. When the network is not secure or is untrusted, the users' presumably secret passwords are susceptible to exposure and monitoring by unauthorized parties if the information is sent in the clear (i.e. not encrypted or protected in some other manner). These outside parties could then replay the new password at some time in the future and gain access to the "protected" resources. To protect the passwords while traveling over public networks, some systems encrypt the passwords with symmetric-key cryptosystems (such as DES, RC5, etc.) or public-key cryptosystems (such as RSA, Elliptic curve, etc.). Encrypting the passwords in this way imposes additional overhead on the local and remote application programs. In addition to having to implement symmetric-key and/or public key crypto systems, they have to have either pre-established shared secret keys or to have a public-key infrastructure in place.

In the art of password security for logging onto a network, various distinct one-way hash functions are used on passwords to protect the secrecy of the passwords when they are transmitted on a non-secure network or transmission medium. Hash functions take an input string (the password) and convert it into an output string from which the input string cannot be determined (at least from a practical perspective the input string cannot be determined). These one-way hash functions are well suited for applications in which the receiving party does not need to know the input string corresponding to an output string in a received message. In this instance, when the user logs on to a network, the user's password is not sent across the network, only the hash of their password is sent, but this has not proven effective for the changing of passwords to the present time.

Encryption schemes have been incorporated into password change protocols to enable secure changing of a password stored at a remote computer. Under such schemes, the sender and receiver of the encrypted password change messages respectively know the operative encryption and decryption schemes. The sender encrypts the messages by applying an encryption scheme utilizing a key to the messages to be sent. The receiver decrypts the messages using a corresponding decryption scheme and corresponding key known by the receiver.

A method of changing passwords by a client was also described by Microsoft Corporation in their patent U.S. Pat. No. 5,719,941 filed Jan. 12, 1996. In that patent, Microsoft describes a method of changing passwords wherein the client computes a first message (M1) by encrypting at least a new clear text password using a one-way hash function of the old password as the encryption key. A second message (M2) is computed by the client by encrypting at least the one-way hash of the old password with a one-way hash of the new password (as the encryption key). The client then transmits the first and second messages (M1 and M2) to the server. After receiving the first message, the server computes a decrypted first message, including at least the new clear text password by decrypting the received first message using a copy of the one-way hash of the old password previously stored by the server as the decryption key. In this way, the new clear text password is obtained. While initially this seems to be an effective means of password changing, it is still open for replay or delay attacks by the unwanted intermediary. The intermediary could intercept the transaction and replay it at a later date.

The present invention presents a method for changing the password to a new password without requiring the use of a symmetric-key or public-key cryptosystem. It does not require a pre-established shared secret key or a public-key infrastructure. It only requires a collision-resistant hash function such as SHA-1 and ensures freshness (hence guarding against intercept and replay attacks) by incorporating random challenges.

SUMMARY OF THE INVENTION

The present invention presents a secure method for changing a password to a new password when the passwords are being transmitted over untrusted networks. The present invention does not require the use of any additional keys (such as symmetric keys or public/private key pairs) to protect the password exchanges. Moreover, the present solution does not require the use of any encryption algorithms (such as DES, RC4/RC5, etc.). The present invention only requires the use of a collision-resistant hash function.

OBJECTS OF THE INVENTION

It is an object of the invention to provide a secure means for a local computer user to change a password residing on a host computer without the need to have a public/private key pair or an agreed-upon symmetric key.

It is a further object of the invention to prevent these changed passwords from being intercepted and replayed by using nonces.

It is a further object of the invention to prevent predators from learning the passwords by not sending the new password across the network, and only sending a randomized digest of the password.

These and other objects of the invention will be presented with respect to the detailed description of the preferred embodiment.

DETAILED DESCRIPTION OF THE PREFERRED EMBODIMENT

The preferred embodiment presented is not meant to limit or restrict the invention in any way. It is meant to teach the skilled practitioner a method of performing the present invention. It will be clear to one skilled in the art that minor modifications to this preferred embodiment can be made without changing the described invention.

Figure 1:
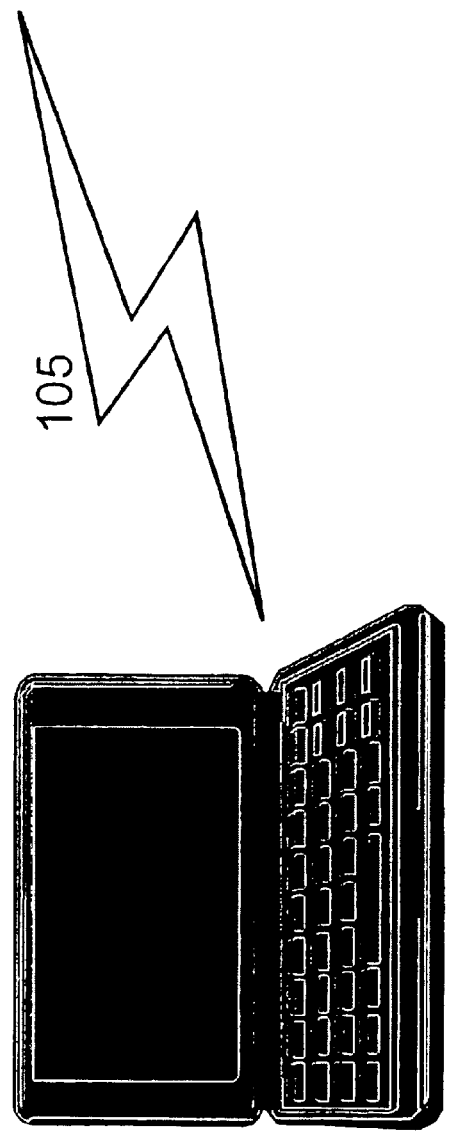
FIG. 1 is a graphical representation of the minimal configuration on which the present invention will work.

A view of the minimum configuration for an embodiment of the present invention is shown in FIG. 1. FIG. 1 depicts a system which has, at a minimum a local user machine 101, or client machine and a host computer 103 or server machine. The local computer and the host computer are connected together by way of a communications medium 105. The communications medium could be, for example, telephone lines, digital satellite or radio communication. Any method of carrying computer communications is acceptable.

In the preferred embodiment, the password protection scheme used for this example will first be discussed. For convenience and ease for the reader, the local application program acting on behalf of the user will be referred to as the "client" and the remote application program to which the client is communicating will be referred to as the "server". For access to the resources at the remote host where the server programs reside, it is assumed that the user has a user identifier (userid) and a password (pw). Access to the server is controlled by a combination of the userid and pw. The password is considered to be a secret value that only the user and the server know. An alternative case would be that the secret password is known only to the user and the server knows a digest or hashed value of the password that it uses for verification. The userid is known to both the user and the server, but unlike the password, it is not meant to be a secret value. In the password mechanism described in the preferred embodiment of the present invention, the logon process occurs as follows:

First the user submits the userid and password to the client. The client then generates a random value (rc) and sends the userid and rc to the server. The server then generates a random value (rs) and sends it back to the client. The random values are called nonces or challenges The client generates a digest of the userid and password such that the digest is a hash function of the userid and password. There are many hash functions that can be used. It is suggested that a strong collision-resistant one-way hash function such as SHA-1 be used. Next the client generates a one-time authentication token such that the authentication token is a hash function of the digest, rc and rs. The authentication token is a one-time value since its value changes for each session due to the random values rc and rs. The inclusion of rc and rs help to ensure the freshness of the communication. Because of the one-way hash function used, the authentication token does not reveal any information about the secret values (i.e. the password or the digest). The client then sends the userid and the authentication token to the server. The server verifies the validity of the received authentication token and if it is valid, the user is allowed to access information residing at the server. This is more easily understood while referring to FIG. 2.

Figure 2:
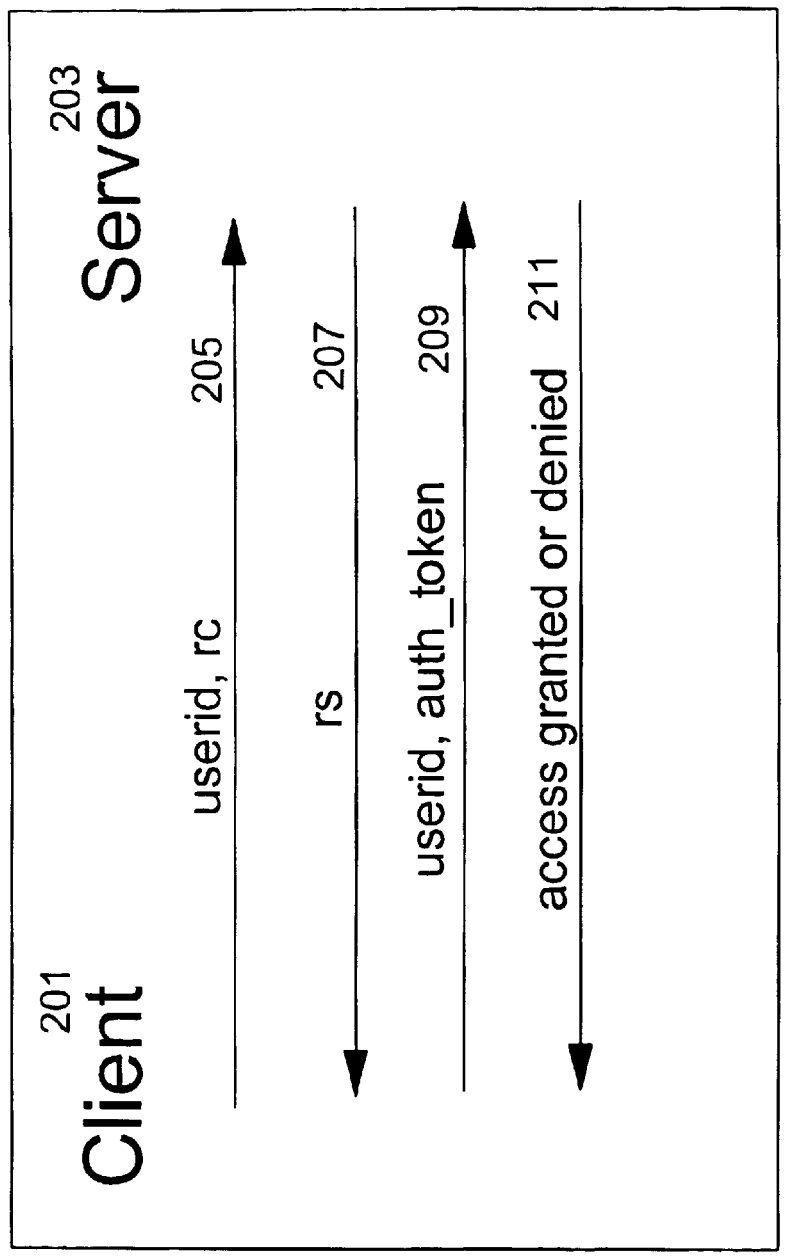
FIG. 2 is an information flow diagram of the password verification mechanism depicted in the preferred embodiment of the present invention.

FIG. 2 depicts the communication between the client and the server with respect to the password exchange. The client 201 first sends the userid and a random number (nonce-rc) 205 to the server 203. The server 203 then sends a random number (nonce-rs) 207 to the client 201. The client 201 responds to the server 203 by sending the userid and an authentication token 209 where the authentication token is a hash of an idpw_digest, rc and rs and the idpw_digest is a hash of the userid and password. The server then checks the validity of the authentication token using the servers copies of the idpw_digest, rc and rs. The client is notified whether access is granted or denied 211. In this way the server can securely authenticate the user without having to actually know the password itself.

If for some reason the user wants to change their password, because the password has been discovered by someone else or because of the time-out mechanisms put in place to maintain secrecy of passwords, a method needs to be present to securely change the password so that no one other than the user/client and the intended server application discover the new password. In the preferred embodiment of the present invention, this is accomplished by using multiple hash algorithms on the userid, old and new passwords and random challenges or nonces sent between the client and the server.

Figure 3:
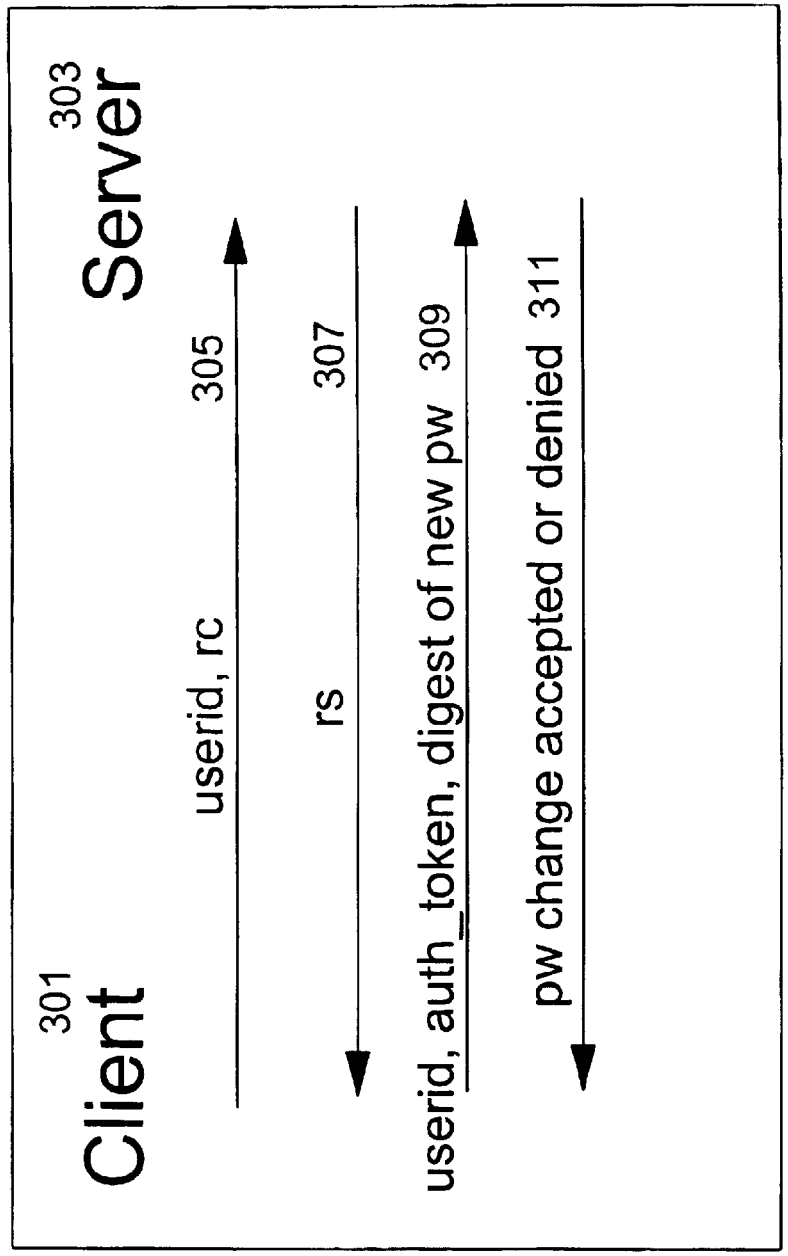
FIG. 3 is an information flow diagram of the password changing mechanism depicted in the present invention.

With reference to FIG. 3, the flow of information in the preferred embodiment will now be addressed. The user first submits their userid, existing password and new password to the client 301. The client 301 generates a random value or nonce (rc) and sends the userid and the random value (rc) 305 to the server 303. The server 303 generates a random value or nonce (rs) and sends 307 it to the client. These random values are sometimes referred to as challenges. The client 301 generates a userid and password digest in addition to a userid and new password digest where the digest is calculated by performing a hash function on the userid and the respective password. It is recommended that a strong, collision-resistant one-way hash function such as SHA-1 be used. The client 301 then generates a one-time authentication token and a one-time authentication token mask value where the one-time authentication token is a hash function of the old userid-password digest, rc and rs and the authentication token mask is a hash function of the userid-password digest, rc plus some predetermined value and rs. The authentication token and the authentication token mask are one-time values since their values change in each session due to the random values rc and rs. Note that because of the one-way hash function, the authentication token and the authentication token mask do not reveal any information about the secret values of the password or the userid-password digest.

The client 301 next generates a value that we will call a protected_idpw_digest by exclusive-or'ing the hash of the userid and the new password and the authentication token mask. The client 301 then sends 309 the userid, authentication token and protected_idpw_digest to the server 303. The server 303 verifies the validity of the received authentication token. If the authentication token is valid, the server 303 sends a message to the client accepting the password change 311. If the authentication token is not valid, the password change is rejected 311.

When the server verifies the authentication token values, the server must use its own copies of the userid-password digest, rc and rs. Using those values, the server must execute the hash function on them and compare the results with the authentication token received from the client. To retrieve the digest of the userid with the new password, the server generates the authentication token mask (as depicted above) and exclusively-or's it with the received protected_idpw_ digest. Using this mechanism, the server never stores the new password itself, it only stores the calculated digest of the userid and the new password.

What is claimed is:

1. A method for securely changing an existing password associated with a user identifier (userid) on a host computer to a new password, wherein said passwords enable a user associated with said userid at a local computer to access information on said host computer across a network; said method comprising the steps of:

sending, by the local computer, the userid and a first nonce to the host computer;

replying, by the host computer to the local computer, with a second nonce;

generating, by the local computer, a first digest of the userid and the existing password and a second digest of the userid and the new password;

creating, by the local computer, an authentication token and an authentication token mask wherein said authentication token is a hash function of the first digest, first nonce and second nonce, and said token mask is a hash function of the second digest, first nonce plus a predetermined value and the second nonce;

generating, by the local computer, a protected digest by exclusive-oring the second digest with the token mask;

sending, by the local computer to the host computer, the userid, authentication token and the protected digest;

verifying, by the host computer, the validity of the authentication token; and, accepting the new password to replace the existing password if the authentication token is valid.

2. A computer program product for securely changing an existing password associated with a user identifier (userid) on a host computer to a new password, wherein said passwords enable a user associated with said userid at a local computer to access information on said host computer across a network; said computer program product comprising:

computer readable programming for sending, by the local computer, the userid and a first nonce to the host computer;

computer readable programming for replying, by the host computer to the local computer, with a second nonce;

computer readable programming for generating, by the local computer, a first digest of the userid and the existing password and a second digest of the userid and the new password;

computer readable programming for creating, by the local computer, an authentication token and an authentication token mask wherein said authentication token is a hash function of the first digest, first nonce and second nonce, and said token mask is a hash function of the second digest, first nonce plus a predetermined value and the second nonce;

computer readable programming for generating, by the local computer, a protected digest by exclusive-oring the second digest with the token mask;

computer readable programming for sending, by the local computer to the host computer, the userid, authentication token and the protected digest;

computer readable programming for verifying, by the host computer, the validity of the authentication token; and, computer readable programming for accepting the new password to replace the existing password if the authentication token is valid.

3. A computer program product as claimed in claim 2 wherein said first and second digests are calculated by performing a hash function of the userids and respective passwords.

4. A computer program product as claimed in claim 2 or 3 wherein said hash function is a collision-resistant, one-way hash.

* * * * *